3,200,606
AIR CONDITIONING SYSTEMS
John B. Hewett, 154 Martling Ave., Tarrytown, N.Y., and Elwood A. Windham, 57 W. Meadow Road, Wilton, Conn.
Filed June 29, 1964, Ser. No. 378,755
7 Claims. (Cl. 62—176)

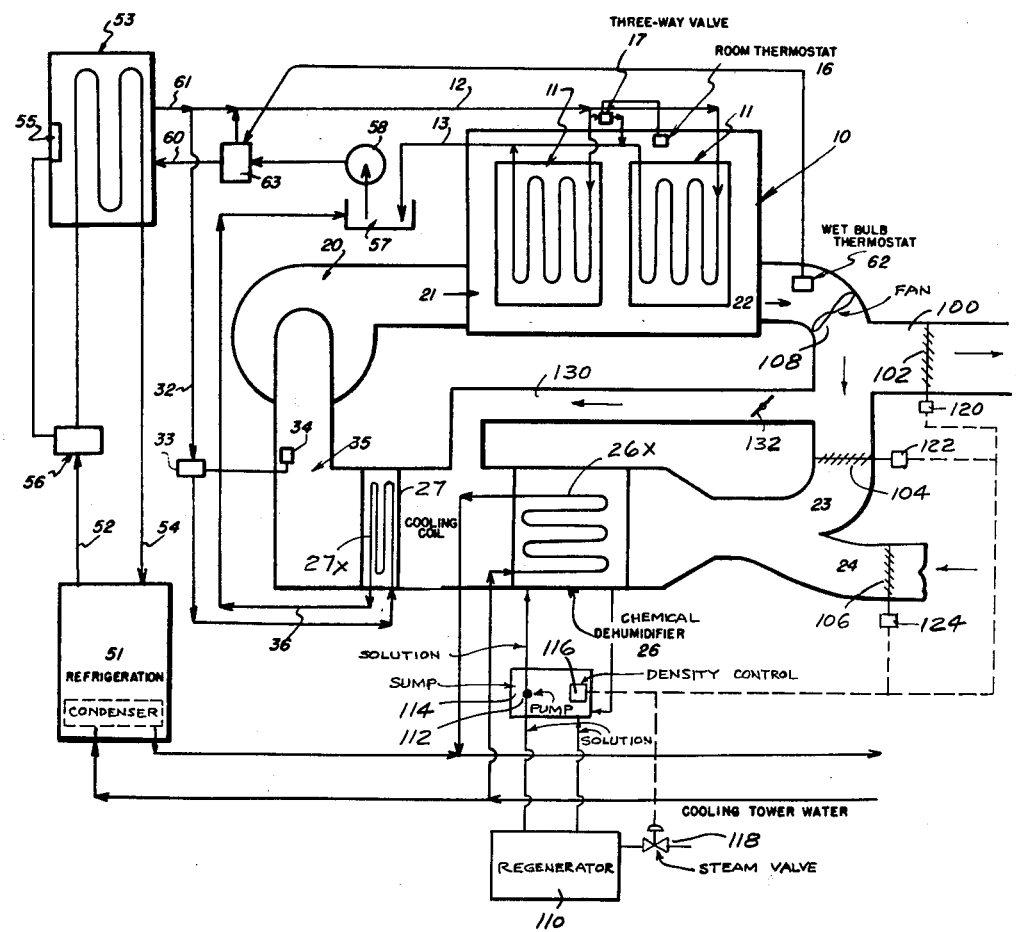

This invention relates to a comfort air conditioning system which employs radiant cooling panels set in the ceiling and/or in the walls of a room or space to be conditioned together with chemically dehumidified and cooled air being supplied to the space for the purpose of eliminating condensation of moisture on the radiant cooling panels, provide ventilation and supplement the cooling effect of the radiant cooling panels.

More particularly, it is directed to improvements in such a system (as exemplified by our Reissue Patent No. 25,550) whereby economies in capital expenditure and operation are achieved. In the system of our reissue patent, we employ a chemical dehumidifier of the liquid type which removes the moisture from the air. It is of particular importance when radiant cooling panels are used in conjunction with cooled air to maintain the desired temperature in the conditioned spaces.

A chemical dehumidifier of the liquid type generally consists of: (1) the dehumidification unit (conditioner) which dehumidifies the air, (2) a regenerator which removes the excessive moisture from the hygroscopic liquid, and (3) a pump unit which circulates the hygroscopic liquid to the conditioner and the regenerator.

As water is removed from the air going through the conditioner, the density of the hygroscopic liquid diminishes, which causes the density controller to supply heat to the regenerator to drive off moisture from the liquid.

In the system exemplified by our reissue patent, the dampers are fixed.

Since it is of vital importance to provide ample regeneration capacity, especially when radiant cooling panels are used in order to prevent condensation, provision is made to prevent at all times condensation on the most humid days, that is, to provide for handling the moisture load under maximum dew point conditions. However, the maximum outside dew point conditions generally occur only a few hours of the summer season. Consequently, the regenerator used in such a system is one of excessive capacity in respect of the operation of the system during the greater part of the season.

We have found that a regenerator of much smaller capacity is effective for operation of the system during all but those few hours of excessive humidity. We have further found that a regenerator of such lesser capacity can be made effective in preventing condensation during the few hours when the maximum dew point occurs by reducing the moisture content of the air which passes through the conditioner during those few hours. We achieve such reduction in the moisture content by suitably modulating the character of the air. This modulation is effected by using modulating dampers which bring about a change in the proportions of the outside air and the recirculating air that passes through the conditioner. Such modulation is achieved by arranging the modulating dampers to respond automatically to variations in the density of the dehumidifying liquid.

Inasmuch as a density control device is a normal component of the system exemplified by our reissue patent aforesaid, we utilize that device to control as well the position of the modulating dampers. Consequently, such automatic modulation allows for varying the moisture content of the air passing through the conditioner by what is in fact a blending of the air streams. Such blending or proportioning is arranged so that the moisture content of the air passing through the conditioner does not exceed the maximum capacity of the regenerator. It will be understood, of course, that the air entering the conditioner may be all outside air, a mixture of the outside air and all the return air, or a mixture of the outside air and a portion of the return air, all depending upon the actual conditions.

Accordingly, it is among the principal objects of this invention to provide an improvement in the system exemplified by our reissue patent aforesaid.

Another object of the invention is to provide the advantages of such an improved system with economies in capital expenditure and operating costs.

The accompanying drawing is a schematic illustration of the system described and exemplified by our reissue patent aforesaid as modified by our improvement thereof.

Referring to the drawing, the system includes a room 10 to be conditioned and two radiant cooling panels 11 which may be set in the walls or ceiling to form a part of the interior. A large number of panels may be used depending upon the size of the space and cooling loads encountered. The radiant cooling panels are connected by a supply pipe 12 and a discharge pipe 13 although it will be obvious that the pipe connection may be either series or parallel or a combination of both. A thermostat 16 is located in each conditioned zone which controls a by-pass valve 17 or throttling valve which controls the amount of cold water being circulated in the radiant panels.

In order to prevent condensation on the radiant cooling panels and to supplement the radiant cooling, a supply of cool dry air is circulated through room 10 by blower 20 through a system of conduits which enters the room at vent 21, leaving at vent 22. There is no necessity of direct physical contact between this air and the radiant cooling panels. The return air, if any, either mixes with outside air which enters through conduit 24 or by-passes the dehumidifier or both. The blower 20 draws outside air and return air, if any, through the dehumidifier 26 and draws the dehumidified air and any by-passed air over a cooling coil (shown diagrammatically as 27 whereof the pipes are shown as 27$^x$) before being blown into the room. Water for the cooling coil 27 enters from pipe 12 through pipe 32 and returned to storage compartment 57 through pipe 36. The dehumidifier 26 is provided with an internally disposed cooling coil 26$^x$ through which cooling tower water passes.

In order to cool the water to a temperature of 45–65° F. flowing through pipes 12 and 13 refrigeration 51 is employed. This unit sends a liquid refrigerant through pipe 52 into a heat exchanger 53. The refrigerant in gaseous form is returned to the refrigeration unit in pipe 54. In order to control the temperature of the cold water circulating in pipes 12 and 13 a thermostat 55 is employed to control a valve 56 in pipe 52 which controls the amount of liquid refrigerant being supplied to heat exchanger 53.

After the cold water passes through the pipes in panel 11 and pipes of cooling coil 27 it is conveyed to a storage compartment 57 and withdrawn from that compartment by pump 58. Under normal circumstances the pump 58 forces the cooling liquid through pipe 60 into heat exchanger 53 and then out the pipe 61 which joins with pipes 12 and 32.

There may be conditions when the humidity in the conditioned space is at a dew point above the temperture of the normal cold water supply in pipe 12. This is particularly the case immediately after a prolonged shut down such as over week ends. In order to protect the system against the possibility of condensation under these conditions a wet bulb thermostat 62 (or dew point stat) is positioned adjacent to the exit vent 22 or, if there is no exit vent, in the conditioned area. Thermostate 62 controls a three way valve 63 which is located to by-pass the heat exchanger 53. When the wet bulb temperature is high the pump 58 circulates the water without sending it through the heat exchanger 53 and prevents condensation from the pipes in panel 11. The dehumidified air entering at 21 reduces the wet bulb temp. As the wet bulb temp. is lowered the thermostat 62 begins to open valve 63 to send some of the water through the heat exchanger 53. When the wet bulb temperature is satisfactory the thermostat 62 will control valve 63 so that all of the water goes through the heat exchanger 53.

Another method when refrigeration is used would be to omit the three way valve 63 and have the thermostat 62 reset the thermostat 55 which controls the temperature of the water.

The foregoing description of the system is exemplified by our reissue patent. We now proceed to describe the modifications thereof.

The numeral 100 designates an exhaust duct within which is a modulating damper 102. In ducts 23 and 24 are modulating dampers 104 and 106 respectively. There may also be included, if desired, a suitable exhaust fan 108.

The numeral 110 designates a conventional regenerator (concentrator) for the dehumidifying liquid. The dehumidifier 26 (the conditioner) and the regenerator 110 are interconnected by pump 112 which is set, for example, in a sump 114. The sump also houses a density control device 116.

As shown, 116 controls steam valve 118, in conventional fashion, to regulate the steam supply for the concentrator 110. In addition, 116 controls the modulating dampers 102, 104 and 106 through interconnection with damper motors 120, 122 and 124 respectively. The connections between 116 and the damper motors 120, 122 and 124, as indicated, are pneumatic lines, but any other suitable means may be used in lieu thereof.

As shown, the system also includes the duct 130 within which is damper 132 thus allowing, if desired, a portion of the return air to by-pass the dehumidifier 26.

It will be observed that the system illustrated allows for the use of outside air, exhaust air, return air mixed with the outside air, and some air by-passing the chemical dehumidifier. Other arrangements also may be used. For example, if only outside air be used and the return air and exhaust air fan be omitted, then only the damper in the outside air duct will be used. If only outside air be used with the exhaust fan operating in the system, then dampers in the outside air duct and in the exhaust duct will be used. If some return air be mixed with the outside air and that mixture dehumidified, but with none of the return air bypassing the dehumidifier, then dampers in the outside air duct, the return air duct and in the exhaust duct will be used and the by-pass duct can be omitted.

As an example of an operation in accordance with our system, arranged so as to operate at a normal high humidity of about 100 grains per pound, and at a fixed volume of 20,000 c.f.m. but adapted by our improvement to operate with an undersized regenerator when an infrequent abnormally high humidity (130 grains per pound) occurs and without condensation, will be apparent from the following data:

*The system when operating under a humidity of 100 grains/lb.*

| | Moisture content, gr./lb. |
|---|---|
| Outside air, 8,000 c.f.m. | 100 |
| Return air, 12,000 c.f.m | 50 |
| Mixture entering the dehumidifier, 20,000 c.f.m | 70 |
| Mixture leaving the dehumidifier | 40 |
| Water removed | 30 |

20,000 c.f.m. × 0.075 = 1,500 lbs. of air/min.

$$\frac{1{,}500 \text{ lbs./min.} \times 30 \text{ gr./lb.}}{7{,}000} \times 60 \text{ min.} = 386 \text{ lbs. of water/hr.}$$

Steam consumption = 386 × 2.92 = 1,140 lbs. steam/hr.

A concentrator is adequate if it removes 386 lbs. of water/hr.

A commercially available concentrator having a capacity adequate to meet such a load (386 lbs. of water/hr.) has a rated capacity of 426 lbs. of water/hr.

*Regeneration capacity required by the system when operating under a humidity of 130 gr./lb. with the same proportion of outside air and return air.*

| | Moisture content, gr./lb. |
|---|---|
| Outside air, 8,000 c.f.m | 130 |
| Return air, 12,000 c.f.m | 50 |
| Mixture entering the dehumidifier | 82 |
| Mixture leaving the dehumidifier | 40 |
| Water removed | 42 |

$$\frac{1{,}500 \text{ lbs./min.} \times 42 \text{ gr./lb.}}{7{,}000} \times 60 = 540 \text{ lbs./hr.}$$

Steam consumption = 540 × 2.92 = 1,580 lbs./hr.

A commercially available concentrator having a capacity adequate to meet such a load (540 lbs. of water/hr.) has a rated capacity of 640 lbs. of water/hr.

*Variation in the proportion of outside air and return air to utilize a regenerator having a capacity of 426 lbs. of water/hr. when the humidity is 130 gr./lb.*

The allowable reduction of the water vapor content of the air allowed to pass through the dehumidifier is calculated as follows:

MAXIMUM WATER REMOVABLE BY THE REGENERATOR $$\frac{426 \text{ lbs. of water/hr.} \times 7{,}000 \text{ gr./lb.}}{60 \text{ min.} \times 1{,}500 \text{ lbs. air/min.}} = 33.1 \text{ gr./lb.}$$

Air mixture leaving the dehumidifier = 40.0 gr./lb.

Therefore, Maximum content of water
in mixture entering the dehumidifier = 73.1 gr./lb.

20,000 c.f.m. = 1,500 lbs./min = Total volume of air.
Let "X" equal lbs./min. of outside air.

WATER CONTENT OF ABOVE MIXTURE $$\overset{\text{Return Air}}{\frac{(1{,}500 \text{ lbs./min.} - X) \; 50 \text{ gr./lb.}} {1{,}500}} + \overset{\text{Outside Air}}{(130 \, X)} = 73.1 \text{ gr./lb.}$$

75,000 − 50 X + 130 X = 109,659
80 X = 34,650
X = 433.1 lbs./air per min. outside air.

Volume of outside air $\frac{433.1}{0.075} = 5{,}774$ c.f.m.

Therefore, 20,000 c.f.m. − 5,774 c.f.m. = 14,226 c.f.m. return air.

Thus, our system employing a regenerator having a capacity of 426 lbs. of water/hr. prevents condensation, when the humdity is 130 gr./lbs. by actuation of the modulating dampers to reduce the volume of outside air to 5,774 c.f.m. while the volume of return air is increased to 14,226 c.f.m.

It will be understood that the foregoing description of the invention and the examples set forth are merely illustrative of the principles thereof. Accordingly, the

We claim:

1. In an air conditioning system having a single chemical dehumidifying unit of the liquid type to remove moisture from the air and a regenerator and a solution density control to govern the operation of the regenerator, said system using outside air and return air, means to reduce the volume of outside air and increase the volume of return air whenever the outside moisture conditions exceed the capacity of the regenerator, said volume reducing means comprising the combination of the solution density control and modulating dampers disposed in the ducts which supply outside air to the dehumidifying unit and return air.

2. In an air conditioning system having a single chemical dehumidifying unit of the liquid type to remove moisture from the air and a regenerator and a solution density control to govern operation of the regenerator, said system using outside air and return air which pass through the dehumidifying unit, the balance of the air in the system being exhausted, means to reduce the volume of outside air and to increase the volume of return air, whenever the outside moisture conditions exceed the capacity of the regenerator, said volume varying means comprising the combination of the solution density control and modulating dampers disposed in the ducts supplying, to the dehumidifying unit, outside air and return air, and in the duct removing the exhaust air.

3. A system in accordance with claim 2 which includes a duct that allows return air to by-pass the dehumidifying unit.

4. In an air conditioning system which utilizes a single chemical dehumidifying unit of the liquid type to remove moisture from the air and a regenerator and a solution density control; radiant cooling panels; and cooled air to maintain the temperature, the system using outside air, means to reduce the volume of outside air whenever outside moisture conditions exceed the capacity of the regenerator, said volume reducing means comprising the combination of the solution density control and a modulating damper disposed in the duct which supply outside air to the dehumidifying unit.

5. In an air conditioning system which utilizes a single chemical dehumidifying unit of the liquid type to remove moisture from the air and a regenerator and a solution density control; radiant cooling panels; and cooled air to maintain the temperature, the system using outside air and a mechanical exhaust, means to reduce the volume of outside air and exhaust air whenever the outside moisture conditions exceed the capacity of the regenerator, said volume reducing means comprising the combination of the solution density control and modulating dampers disposed in the ducts which supply the outside air and remove the exhaust air.

6. In an air conditioning system having a single chemical dehumidifying unit of the liquid type to remove moisture from the air and a regenerator and a solution density control; radiant cooling panels; and cooled air to maintain the temperature, said system using outside air and a portion of return air which pass through the dehumidifier, the balance of the return air being exhausted, means to reduce the volume of outside air and exhaust air and to increase the volume of return air whenever the outside moisture conditions exceed the capacity of the regenerator, said volume varying means comprising the combination of the solution density control and modulating dampers disposed in the ducts which supply the outside air and the return air to the dehumidifying unit and remove the exhaust air.

7. A system in accordance with claim 6 including a duct which allows the return air to by-pass the dehumidifying unit.

References Cited by the Examiner

UNITED STATES PATENTS

| 2,881,853 | 4/59 | Kelley | 55—32 |
| 3,009,331 | 11/61 | Hewett | 62—176 |
| 3,102,399 | 9/63 | Meckler | 62—271 |

WILLIAM J. WYE, *Primary Examiner.*